Patented Dec. 5, 1933

1,938,083

UNITED STATES PATENT OFFICE 1,938,083

TREATMENT OF GASES CONTAINING UNSATURATED HYDROCARBONS

Martin Mueller-Cunradi, Ludwigshafen-on-the-Rhine, Otto Eisenhut, Heidelberg, and Heinrich Schilling, Ludwigshafen-on-the-Rhine, Germany, assignors to I. G. Farbenindustrie Aktiengesellschaft, Frankfort-on-the-Main, Germany, a corporation of Germany No Drawing. Application July 29, 1929, Serial No. 382,062, and in Germany August 3, 1928

7 Claims. (Cl. 260—170)

This invention relates to improvements in the treatment of gases containing unsaturated hydrocarbons and in particular acetylene.

In the thermal treatment of gases comprising gaseous hydrocarbons, in particular methane, for example in the electric arc, gas mixtures containing hydrogen and unsaturated hydrocarbons, in particular acetylene, are obtained.

We have now found that the gas mixtures so obtained can be worked up in an advantageous manner by removing the unsaturated hydrocarbons, for example the ectylene, under pressure, for example by washing out, or by means of absorbents, which expression also includes adsorbents, or by cooling to low temperatures or a combination of these methods and preferably then employing the residual compressed hydrogen or gas mixture containing the same directly for reactions which are carried out under pressure and require hydrogen, for example for the destructive hydrogenation of distillable carbonaceous materials, such as various kinds of coal, tars, mineral oils and the like. This process has the advantage that the energy employed for the separation of the hydrocarbons is utilized for another process.

As examples of pressures coming into question for the process according to the present invention may be mentioned such of 10, 20, 30 or 100 atmospheres. Higher pressures, for example 200 atmospheres, and even more may be employed for the removal by adsorption or by washing with solvents, and these operations may be carried out at ordinary temperature or while cooling. Temperatures higher than room temperature are as a rule avoided, on account of the rapid decrease of the solubility of the gases in the liquids or of the adsorption capacity of the adsorbents at these temperatures.

We have further found that ketones containing more than three carbon atoms in the molecule are very suitable as washing media, and that these are even capable of general application, as solvents for the recovery by a washing out process of unsaturated hydrocarbons, as for example ethylene, propylene, butylene or diolefines, such as butadiene and in particular of acetylene from gaseous mixtures containing the said unsaturated hydrocarbons, increased pressure being applied or not, as desired.

As examples of ketones of the character described may be mentioned aliphatic ketones, such as methyl ethyl ketone, methyl propyl ketone, diethyl ketone, diacetone alcohol, and ketone oils (the heavy oils obtained as a by-product in refining acetone) and such ketones as contain at least one aromatic or hydroaromatic radical. As examples of such ketones may be mentioned acetophenone, cyclohexanone and methyl cyclohexanone. The ketones obtained by the catalytic hydrogenation of oxides of carbon, which may, for example, be separated from the reaction mixture by treatment with a mineral acid in the presence of water, are also very suitable. The solubility of unsaturated hydrocarbons and especially of acetylene in the said ketones is very extensive. The said ketones have the great advantage over acetone for the purpose in question that they have a lower volatility.

The following examples will further illustrate how the invention may be carried out in practice, but the invention is not restricted to these examples.

Example 1

A gas mixture having the following composition: 81 per cent of $H_2$, 1 per cent of $C_mH_n$, 15 per cent of $CH_4$ and homologues thereof, and the remaining 3 per cent $N_2$, $CO$, $CO_2$, and $H_2S$, such as may be obtained, for example, in addition to the liquid products, in the destructive hydrogenation of coal, is treated in an electric arc, preferably after the removal of sulphur.

In this manner a gas mixture having the following composition is obtained: 84 per cent of $H_2$, 8 per cent of $C_2H_2$, 4.6 per cent of $CH_4$, 1.5 per cent of $C_mH_n$, and 1.9 per cent of $N_2$ and others.

In order to remove the acetylene this is washed, for example, with cyclohexanone as the solvent, under a pressure of about 25 atmospheres, a portion of the other unsaturated hydrocarbons contained in the gas also being dissolved. The washed gas, still under pressure, which contains, besides small quantities of acetylene (about 0.1 to 0.2 per cent) nitrogen and the other constituents already described, about 92 per cent of hydrogen and 5.5 per cent of saturated hydrocarbons, can be directly employed under the existing pressure, which, if desired, may be increased or diminished, for example for the destructive hydrogenation of coal, hydrocarbons, or for the reduction of oxides of carbon and other reducible compounds containing oxygen.

The acetylene may also be recovered from the gas mixture obtained from the arc by being passed under a pressure of about 20 atmospheres through active charcoal, the amount of acetylene adsorbed under pressure being four times in excess of that adsorbed under atmospheric pressure. The acetylene is adsorbed in an almost quantitative manner, and a gas remains containing about 92 per cent of hydrogen, and the remainder of the methane, nitrogen and traces of unsaturated hydrocarbons, which mixture may be employed directly under its existing pressure, for hydrogenation purposes.

Example 2

A gaseous mixture containing from 6 to 7 per cent of acetylene is washed with cyclohexanone at ordinary temperature and under a pressure of 20 atmospheres in such a manner that while leading the liquid in a cycle 100 liters of cyclohexanone are allowed to act on 150 cubic meters of the gaseous mixture per hour. Under these conditions 9 cubic meters of acetylene per hour are washed out from the gaseous mixture. The acetylene may be recovered from the washing liquid by releasing the pressure or/and raising the temperature.

Similarly, 6 cubic meters of acetylene per hour may be recovered from 100 cubic meters of the gaseous mixture by means of 100 liters of diethyl ketone (boiling point about 102° C.) under the same conditions of pressure and temperature.

Example 3

A gas mixture obtained by a treatment in the electric arc as described in Example 1 is cooled down to a temperature of 100° below zero C. under a pressure of 70 atmospheres. 90 per cent of the acetylene and of the other unsaturated hydrocarbons is thus separated off. The residual gas mixture is employed directly under the same pressure for hydrogenation or destructive hydrogenation process.

What we claim is:

1. A process for the recovery of unsaturated hydrocarbons from a gaseous mixture containing the same, which comprises washing the said gaseous mixture with a normally liquid alicyclic ketone containing more than three carbon atoms in the molecule to effect a dissolution of said unsaturated hydrocarbons.

2. A process for the recovery of acetylene from a gaseous mixture containing the same, which comprises washing the said gaseous mixture with a normally liquid ketone containing at least one hydroaromatic radical in the molecule.

3. A process for the recovery of acetylene from a gaseous mixture containing the same, which comprises washing the said gaseous mixture with a normally liquid alicyclic ketone containing more than three carbon atoms with the application of pressure.

4. A process for the recovery of acetylene from a gaseous mixture containing the same, which comprises washing the said gaseous mixture with cyclohexanone.

5. A process for the recovery of acetylene from a gaseous mixture containing the same, which comprises washing the said mixture with cyclohexanone under a pressure of about 20 atmospheres.

6. A process for the recovery of unsaturated hydrocarbons from a gaseous mixture containing the same in admixture with hydrogen, which mixture has been obtained by thermal treatment of gases comprising gaseous hydrocarbons, which comprises removing the unsaturated hydrocarbons from the said gaseous mixture while working under pressure by washing out said unsaturated hydrocarbons with a normally liquid alicyclic ketone containing more than three carbon atoms in the molecule.

7. A process for the recovery of acetylene from a gaseous mixture containing the same in admixture with hydrogen, which mixture has been obtained by thermal treatment of gases comprising gaseous hydrocarbons, which comprises applying pressure to the said gaseous mixture while treating it with a normally liquid alicyclic ketone having more than three carbon atoms in the molecule to dissolve the acetylene.

MARTIN MUELLER-CUNRADI.
OTTO EISENHUT.
HEINRICH SCHILLING.